(12) United States Patent
Robertson et al.

(10) Patent No.: US 6,794,439 B1
(45) Date of Patent: Sep. 21, 2004

(54) ACRYLIC POLYMER COMPOSITION

(75) Inventors: Graeme Robertson, Billingham (GB); Ian Muir Fraser, Yarm (GB)

(73) Assignee: Lucite International UK Limited, Southhampton (GB)

( * ) Notice: Subject to any disclaimer, the term of this patent is extended or adjusted under 35 U.S.C. 154(b) by 0 days.

(21) Appl. No.: 09/744,162

(22) PCT Filed: Jul. 9, 1999

(86) PCT No.: PCT/GB99/02206

§ 371 (c)(1),
(2), (4) Date: Jan. 22, 2001

(87) PCT Pub. No.: WO00/05284

PCT Pub. Date: Feb. 3, 2000

(30) Foreign Application Priority Data

Jul. 21, 1998 (GB) ............................................. 9815730

(51) Int. Cl.[7] .............................. C08K 3/36; C08K 3/22
(52) U.S. Cl. ........................ 524/493; 524/431; 524/558
(58) Field of Search ................................ 524/493, 431, 524/558

(56) References Cited

U.S. PATENT DOCUMENTS

| | | | |
|---|---|---|---|
| 4,145,477 A | * | 3/1979 | Smiley |
| 5,705,552 A | * | 1/1998 | Minghetti et al. |
| 5,753,362 A | * | 5/1998 | Kawase et al. |

FOREIGN PATENT DOCUMENTS

| | | |
|---|---|---|
| EP | 571 808 | 12/1993 |
| EP | 659 530 | 6/1995 |
| EP | 685 511 | 12/1995 |
| WO | WO 96/26238 | 8/1996 |
| WO | WO 97/14749 | 4/1997 |

* cited by examiner

Primary Examiner—Tae H. Yoon
(74) Attorney, Agent, or Firm—Pillsbury Winthrop LLP

(57) ABSTRACT

An abrasion resistant acrylic composition comprises at least 70% w/w of the residues of at least one polmerisable acrylic monomer, 0.2–5% w/w of a finely divided compound comprising at least one oxide selected from silicon, titanium, zirconium and aluminum oxides, and 0.2–25% w/w of at least one linking compound which is miscible with said polymerisable acrylic monomer and which is capable of bonding to the surface of the oxide compound. The acrylic composition may be thermoformed while retaining its abrasion resistant surface properties.

11 Claims, No Drawings

ACRYLIC POLYMER COMPOSITION

The present invention relates to an abrasion resistant polymer composition and a process for its preparation.

Acrylic sheet materials are widely used for building and glazing applications and to form various shaped articles such as baths, sinks, vanity units and shower trays. The abrasion resistance of the acrylic sheet used in such applications is normally required to be as high as possible. One method that is currently used to improve the abrasion resistance of acrylic surfaces involves the application of an abrasion resistant coating to the surface of an acrylic sheet. The coating is typically applied in solution to the acrylic sheet and is then cured, for example by radiation (UV), solvent evaporation or by thermal curing. For example, EP-A-571808 discloses antifogging film, plates and articles comprising an acrylic polymer support and a polymerised and UV reticulated abrasion resistant coating containing acrylic monomers and hydrophilic metal oxide(s). Examples of components within the coating that are thought to provide the abrasion resistant property are titanium, silica, aluminium compounds. Although abrasion-resistant coatings can enhance the performance of acrylic surfaces against abrasion, their use on acrylic sheet which is to be shaped, e.g. by thermoforming, may be limited by the relatively inelastic nature of the coating, which may cause cracking of the coating as the surface is deformed. Conventional coating technology requires a two step process: polymerising the sheet followed by coating and curing the abrasion resistant formulation. In practice, this often requires a clean room environment to ensure no dust particles become incorporated into the surface layer. There is therefore a significant manufacturing advantage to be gained for an abrasion resistant product which may be delivered in a one-step process.

Curable acrylic compositions containing a high proportion of a mineral filler, such as silica or alumina particles, are well known. These compositions are typically used to form articles such as kitchen sinks or worktops by mixing with a suitable thermal initiator and then pumping them into a heated mould whereupon they are cured to form a solid and inflexible opaque moulded article. These articles generally have a relatively high resistance to abrasion compared to unfilled acrylic sheets of the type which are suitable for thermoforming. The addition of similar filters at much lower levels to acrylic sheet materials may give some abrasion resistance properties but the polymer formed is hazy and hence has poor optical properties.

It is therefore an object of the invention to provide an acrylic article which has better resistance to abrasion than unfilled acrylic materials but which has acceptable optical properties for some typical sheet applications.

Accordingly, in a fast aspect, the present invention provides an acrylic composition comprising at least 70% w/w of the residues of at least one polymerisable acrylic monomer, 0.2–5% w/w of a finely divided compound comprising at least one oxide selected from silicon, titanium, zirconium and aluminium oxides, and 0.2–25% w/w of at least one linking compound which is miscible with said polymerisable acrylic monomer and which is capable of bonding to the surface of the oxide compound.

In a second aspect the present invention provides a polymerisable composition comprising at last 70% w/w of at least one polymerisable acrylic monomer, 02–5% w/w of a finely divided compound comprising at least one oxide selected from silicon, titanium, zirconium and aluminium oxides, and 0.2–25% w/w of at least one linking compound which is miscible with said polymerisable acrylic compound and which is capable of bonding to the surface of the oxide compound.

In a third aspect the present invention provides a process for forming an acrylic composition comprising the steps of:

(a) mixing together
  (i) 70–99.5% w/w of a polymerisable acrylic monomer or a solution of a polymer in a polymerisable acrylic monomer with
  (ii) 0.5–30% w/w of a dispersion comprising 20–50% w/w of a finely divided compound selected from the oxides of silicon, titanium, zirconium or aluminium and 50–80% of a linking compound least one linking compound which is miscible with said polymerisable acrylic compound and which is capable of bonding to the surface of the oxide compound;

(b) adding to said mixture a quantity of one or more initiator(s) which is sufficient to initiate polymerisation of the acrylic monomer under the conditions used; and (c) causing the acrylic monomer to polymerise.

Although dispersions of colloidal silica particles for example, in e.g. hydroxyethyl methacrylate are known for use in coating compositions used to provide abrasion resistant coatings on acrylic surfaces, it has been surprisingly found that the addition of such a composition containing an abrasion resistant component to the monomer(s) used to make the acrylic polymer before polymerisation results in a polymer with good optical properties and also improved abrasion resistant properties compared to the unmodified polymer.

The polymerisable acrylic monomers are alkyl (alk) acrylic acids and esters thereof, including functionalised monomers such as hydroxy, halogen or amine functionalised acrylate or methacrylate monomers. Preferably the monomer(s) comprise one or more alkyl acrylates, alkyl methacrylates or acrylic or methacrylic acid, e.g. methyl, ethyl, hydroxyethyl, cyclohexyl or phenyl esters of acrylic acid or methacrylic acid. One preferred acrylic material comprises a homopolymer or copolymer of methyl methacrylate comprising 80–100% of methyl methacrylate residues and 0–20% of an alkyl acrylate or methacrylate selected from those materials listed above.

The at least one linking compound is miscible with the acrylic monomer(s) and preferably contains at least one functional group such as an acrylate or methacrylate group which may be copolymerisable with the acrylic monomers. When more than one functional acrylate or methacrylate group is present, the linking compound may be capable of providing a cross-linking site in the acrylic polymer. The linking compound is also capable of bonding to the surface of the oxide compound and this is conveniently achieved by the use of compounds containing polar groups, e.g. having hydroxyl functionality. Preferred compounds are hydroxyl or other polar group-containing acrylate or methacrylate compounds although other compounds may also be suitable. Suitable compounds include hydroxyethyl methacrylate (HEMA), hexanediol diacrylate, tripropylglycol methacrylate, ethylene glycol monopropylether, 3-aminopropyl trimethoxysilane and ethanolamine or mixtures thereof. Some compounds may perform the function of the linking compound adequately whilst having certain disadvantages in certain applications, e.g. the use of coloured compounds or compounds which develop a colour under the conditions of manufacture of the composition or any article made therefrom may be unsuitable when a clear product is required.

The finely divided oxide compound preferably has an average particle size between 1 and 50 nm, more preferably between 5 and 35 nm. It is present at 0.2–5% in the composition, more preferably at 0.5 to 3% by weight. A preferred oxide compound is colloidal silica. The oxide compound is preferably added to the acrylic monomer or polymer/monomer solution in the form of a dispersion in the linking compound. Suitable dispersions are available commercially for use as coating compositions to provide abrasion resistant coating. Examples of suitable commercial dispersion include the HIGHLINK™ compounds available from Clariant, e.g, Highlink OG 100-30. The ratio of said linking compound to said finely divided oxide is preferably in the range 1:1–5:1 (more preferably 2:1–4:1) by weight. The dispersion is preferably present at 0.2 to 10%, more preferably 2 to 8% by weight in the polymerisable composition.

The acrylic compositions can be made by conventional free radical, anionic or other polymerisation techniques, for example bulk, solution or suspension with the addition of suitable initiators and optionally chain transfer agents and/or other additives such as cross-linking additives, fillers, pigments, plasticisers, impact modifiers, stabilisers etc. Therefore the monomer(s) are caused to polymerise by initiating the polymerisaton reaction, normally by means of activating the added initator, and maintaining suitable conditions, e.g. an elevated temperature, pressure etc until the required degree of polymerisation has been achieved. Such methods am already very well known to the skilled person and a large number of such methods exist in the art. As one preferred option, free-radical polymerisation is used, e.g. in a bulk polyrnerisation process used in the well-known cell-casting method of manufacturing high molecular weight acrylic sheets in which a (mixture of) polymerisable monomer(s), optionally with polymer dissolved therein to form a syrup, is mixed with an initiator or mixture of initiators and other additives and filled either into the gap between two glass plates which are separated by a gasket or into a bag or other mould. The polymerisation reaction is then thermally initiated and the polymer allowed to form and cure at elevated temperature. The acrylic composition of the present invention may be in the form of sheets, which may be suitable for shaping by e.g. (thermo)forming, or of powders or pellets, which may be extruded. When a powdered or pelleted compound is required then the method of polymerising the polymer may also be selected from suspension polymerisation, solution polymerisation or by crushing or pelletising a bulk polymerised product. Methods of forming acrylic polymers by suspension or solution polymerisation are well known in the art and therefore need not be further described.

The present invention is illustrated by reference to the following examples.

EXAMPLE 1

Preparation of Cast Polymethylmethacryate (PMMA) Sheet

A mixture comprising 2,2—azobisisobutyronitrile (AIBN) (0.08% by weight), HIGHLINK™ OG 100-30 (from Clariant) which is a dispersion of 30% by weight colloidal silica of a particle size 13–30 nm in HEMA (2.5% by weight), with the balance of the composition being made up of a standard PMMA syrup comprising a solution of PMMA in methylmethacrylate (MMA) monomer was mixed using a high shear mixer at maximum setting for 1 minute. The mixture was placed in a cell comprising two glass sheets spaced 3.2 mm apart from each other by a non metallic gasket. The cell was sealed and immersed in a water bath at 45° C. for 20 hours The mixture was then post cured for 2 hours at 60° C. followed by 2 hours at 80° C., followed by heating at a rate of 0.5° C./min up to 118° C. and held at 118° C. for 1 hour. The cell was then cooled and the glass sheets removed to release the resulting cast PMMA sheet.

50 mm square samples of the cast PMMA were abraded by applying their surface a rotating 33 mm diameter circular abrasive disc comprising aluminium oxide bonded in resin fibres ("ROLOC FINE GREEN" from 3M company) for 60 seconds at a constant 180 rpm under loading forces of 1, 10 and 20 Newtons (N) respectively. The abrasion resistance of each sample was estimated by determining the light transmission and haze before and after the abrasion treatment using a spectrophotometer in accordance with ASTM D1925-76. The results are shown in the table.

EXAMPLE 2

A cast PMMA sheet was made as described in example 1 using only 0.5% w of the Highlink in the formulation. Testing was carried out as before at a loading of 20N.

EXAMPLE 3 (Comparative)

Preparation of Coated PMMA Samples

A 3 mm thick sample of cast PMMA sheet was coated with a mixture of HIGHLINK OG 100-30 and 0.2% w/w/ of AIBN initiator at various wet thicknesses of 100, 50, 24 and 12 microns and cured. The resulting coatings were poorly adhered to the substrate and showed evidence of cracking and for this reason they were not tested. In order to improve the coating properties, a coating was formulated from a trifunctional aliphatic polyester urethane acrylate oligomer (Craynor™ 929 from Cray Valley) diluted to 50% w/w in hexanediol diacrylate with the HIGHLINK composition at a ratio of 1:1 by weight A photoinitiator (Darocur™ 1173) was added at 2% w/w prior to coating. The coating was applied at a wet thickness of 4 microns and cured under UV light in a commercial UV coating apparatus. The coated samples were then tested as described in example 1. The results show that the abrasion resistance performance was comparable to that of Examples 1 & 2.

EXAMPLE 4 (Comparative)

50 mm square samples of standard cast PMMA coated at 4 microns wet thickness with UVECRYL™ 29203 (UCB Resins), a UV curable aliphatic urethane acrylate abrasion resistant coating, were prepared and abraded on the coated surface. The optical properties were measured as described in Example 1. The results show that the PMMA of the present invention is at least comparable in abrasion resistance performance to PMMA coated with "UVECRYL 29203".

EXAMPLE 5 (Comparative)

50 mm square samples of unmodified cast PMMA, i.e. PMMA syrup polymerised without the presence of the oxide compound, were abraded and the optical properties measured as described in Example 1. The results show that the abrasion resistance of the samples of the invention are superior to that of the unmodified PMMA, in that the light transmission remains greater and the haze less than that of the unmodified PMMA at all loading levels.

EXAMPLE 6 (Comparative)

A PMMA sample was cast from a similar PMMA in MMA syrup which had been mixed with cristobalite silica (mean particle size 6 nm) dispersed as a slurry in MMA, i.e. so that the linking compound of the invention was not present. The amount of slurry used gave a total concentration of 0.75% w/w of silica in the total acrylic mixture. The mixture was initiated and polymerised as before. The resulting sample of acrylic polymer was abraded and tested as described in Example 1. The results show that this material had a much higher haze value than the hers and that the light transmission and haze degraded with abrasion.

|  | Light Transmission | | | | Haze | | | |
| --- | --- | --- | --- | --- | --- | --- | --- | --- |
| Loading (N) | 0 | 1 | 10 | 20 | 0 | 1 | 10 | 20 |
| Ex 1 | 90.4 | 88.8 | 87.3 | 85.9 | 1.6 | 9.7 | 13.5 | 16.6 |
| Ex 2 | 92.3 | | | 83.5 | 0.7 | | | 24.5 |
| Ex 3 (comp) | 92.1 | 90.0 | 89.1 | 84.2 | 0.4 | 6.0 | 13.0 | 22.7 |
| Ex 4.(comp) | 92.1 | 88.9 | 85.9 | 84.5 | 0.1 | 8.5 | 10.0 | 27.0 |
| Ex 5 (comp) | 92.4 | 86.7 | 80.9 | 82.5 | 0.2 | 19.9 | 34.9 | 31.6 |
| Ex 6 (comp) | 87.0 | | 85.3 | 81.1 | 15.7 | | 21.9 | 36.9 |

EXAMPLE 7

Thermoforming of Samples

PMMA sheet of Examples 1, 3 and 5, was (thermo) formed by placing a mould and sheet assembly in an electric oven preheated at 180° C. for 30 minutes. A two-stage rotary vacuum pump was attached to the mould and maximum vacuum applied. When thermoforming had been completed the assembly was cooled under vacuum until the PMMA surface temperature had dropped to 80° C. or below. The moulded article was then removed from the mould. The resulting mouldings from Examples 1 and 5 were satisfactory in appearance whilst that of Example 3 was shown not to have been fully drawn and cracks were visible on the drawn surface.

What is claimed is:

1. An uncoated acrylic polymer product obtained from an acrylic composition comprising at least 70% w/w of the residues of at least one polymerizable acrylic monomer, 0.2–5% w/w of a colloidal dispersion of a compound having a particle size between 1 and 50 nm and comprising at least one oxide selected from silicon, titanium, zirconium and aluminum oxides, and 0.2–25% w/w of at least one linking compound which is miscible with said polymerizable acrylic monomer and which is capable of bonding to the surface of the oxide compound.

2. A product as claimed in claim 1, wherein the linking compound contains at least one functional group which is copolymerizable with the acrylic monomers and a polar group and which is capable of bonding to the surface of the oxide compound.

3. An uncoated acrylic polymer product obtained from an acrylic composition comprising at least 70% w/w of the residues of at least one polyrnerizable acrylic monomer, 0.2–5% w/w of a finely divided colloidal dispersion of a compound having a particle size between 1 and 50 nm and comprising at least one oxide selected from silicon, titanium, zirconium and aluminum oxides, and 0.2–25% w/w of at least one linking compound which is miscible with said polymerizable acrylic monomer and which is capable of bonding to the surface of the oxide compound, wherein the linking compound comprises a monofunctional or polyfunctional acrylate or methacrylate compound which additionally contains a polar group.

4. An uncoated acrylic polymer product obtained from an acrylic composition comprising at least 70% w/w of the residues of at least one polymerizable acrylic monomer, 0.2–5% w/w of a colloidal dispersion of a compound comprising at least one oxide selected from silicon, titanium, zirconium and aluminum oxides, and 0.2–25% w/w of at least one linking compound which is miscible with said polymerizable acrylic monomer and which is capable of bonding to the surface of the oxide compound, wherein the linking compound is selected from hydroxyethylmethacrylate, hexanedioldiacrylate or tripropylglycolmethacrylate.

5. An uncoated acrylic polymer product obtained from an acrylic composition comprising at least 70% w/w of the residues of at least one polymerizable acrylic monomer, 0.2–5% w/w of a finely divided oxide compound and 0.2–25% w/w of at least one linking compound which is miscible with said polymerizable acrylic monomer and which is capable of bonding to the surface of the oxide compound, wherein the finely divided oxide compound comprises colloidal silica.

6. A product as claimed in claim 1, wherein the ratio of said linking compound to said colloidal dispersion of said oxide is in the range 1:1–5:1 by weight.

7. An uncoated acrylic polymer product obtained from a polymerizable composition comprising at least 70% w/w of at least one polymerizable acrylic monomer, 0.2–5% w/w of a colloidal dispersion of a compound having an average particle size between 1 and 50 nm and comprising at least one oxide selected from silicon, titanium, zirconium and aluminum oxides, and 0.2–25% w/w of at least one linking compound which is miscible with said polymerizable acrylic monomer and which is capable of bonding to the surface of the oxide compound.

8. A process for forming an acrylic composition comprising:
   (a) mixing together 70–99.5% w/w of a polymerisable acrylic monomer or a solution of a polymer in a polymerisable acrylic monomer with 0.5–30% w/w of a dispersion comprising 20–50% w/w of a finely divided compound selected from oxides of silicon, titanium, zirconium or aluminum derived from a colloidal dispersion of particles of said compound and 50–80% of at least one linking compound which is miscible with said polymerisable acrylic compound and which is capable of bonding to the surface of the oxide compound;
   (b) adding to said mixture a quantity of one or more initiator(s) which is sufficient to initiate polymerization of the acrylic monomer under the conditions used; and
   (c) polymerising the acrylic monomer.

9. A product as claimed in claim 1, in the form of a sheet, powder, pellet or bead.

10. Process of manufacturing an uncoated abrasion resistant polymer product comprising polymerizing and shaping an acrylic composition comprising at least 70% w/w of the residues of at least one polymerizable acrylic monomer, 0.3–5% w/w of a finely divided compound having an average particle size between 1 and 50 nm and comprising at least one oxide selected from silicon, titanium, zirconium and aluminum oxides derived from a colloidal dispersion of particles of said compound, and 0.2–25% w/w of at least one linking compound which is miscible with said polymerizable acrylic monomer and which is capable of bonding to the surface of the oxide compound.

11. Process of manufacturing an uncoated abrasion resistant polymer product comprising polymerizing and shaping a polymerizable composition comprising greater than 70% w/w of at least one polymerizable acrylic monomer, 0.3–5% w/w of a finely divided compound having an average particle size between 1 and 50 nm and comprising at least one oxide selected from silicon, titanium, zirconium and aluminum oxides derived from a colloidal dispersion of particles of said compound, and 0.2–25% w/w of at least one linking compound which is miscible with said polymerizable acrylic monomer and which is capable of bonding to the surface of the oxide compound.

* * * * *